US012565184B2

(12) United States Patent
Jung et al.

(10) Patent No.: US 12,565,184 B2
(45) Date of Patent: Mar. 3, 2026

(54) ELECTROMECHANICAL BRAKE AND OPERATING METHOD THEREOF

(71) Applicant: HL MANDO CORPORATION, Pyeongtaek-si (KR)

(72) Inventors: Kyungho Jung, Yongin-si (KR); Seungtae Baek, Seongnam-si (KR); Seongho Choi, Anyang-si (KR); Joon-Kyu Song, Seongnam-si (KR)

(73) Assignee: HL MANDO CORPORATION, Pyeongtaek-Si (KR)

( * ) Notice: Subject to any disclaimer, the term of this patent is extended or adjusted under 35 U.S.C. 154(b) by 559 days.

(21) Appl. No.: 18/115,214

(22) Filed: Feb. 28, 2023

(65) Prior Publication Data

US 2023/0271596 A1 Aug. 31, 2023

(30) Foreign Application Priority Data

Feb. 28, 2022 (KR) ........................ 10-2022-0026028

(51) Int. Cl.
*B60T 13/74* (2006.01)
*B60T 1/06* (2006.01)
(Continued)

(52) U.S. Cl.
CPC ............ *B60T 13/746* (2013.01); *B60T 1/065* (2013.01); *B60T 17/22* (2013.01); *F16D 65/18* (2013.01);
(Continued)

(58) Field of Classification Search
CPC ........ F16D 65/18; F16D 65/46; F16D 65/567; F16D 65/66; F16D 2125/40;
(Continued)

(56) References Cited

U.S. PATENT DOCUMENTS

2004/0173041 A1* 9/2004 Said .................... F16H 25/2056
74/89.35
2006/0081076 A1* 4/2006 Otaki ...................... F16D 65/18
74/89.4
(Continued)

FOREIGN PATENT DOCUMENTS

JP 5058189 B2 10/2012
KR 10-2021-0002010 A 1/2021

*Primary Examiner* — Nicholas J Lane
(74) *Attorney, Agent, or Firm* — Hauptman Ham, LLP

(57) ABSTRACT

An electromechanical brake and an operating method thereof are disclosed. According to an aspect of the present disclosure, there may be provided an electromechanical brake including: a piston which is provided to be capable of advancing and retreating to press a pad plate; a power conversion unit including a spindle which rotates by receiving a driving force from an actuator, and a nut which is connected to the spindle and advances or retreats by rotation of the spindle in a first direction or a second direction; and a positioning portion which is screwed with a thread formed inside the piston, receives a rotational force from a drive motor, linearly moves according to rotational movement, and adjusts a relative position of the piston with respect to the power conversion unit, wherein the positioning portion includes a first screw provided on an outer surface of one side of the nut and having, on an outer peripheral surface, a first thread that meshes with the thread, a second screw provided on an outer side surface of the other side of the nut and having, on an outer peripheral surface, a second thread that meshes with the thread, a first gear provided to rotate together with the second screw by receiving the rotational force from the drive motor, and an interlocking member provided between the first screw and the second screws to interlock and linearly move the first and second screws by the rotation of either the first screw or the second screw and adjust a relative position with the piston.

15 Claims, 14 Drawing Sheets

(51) Int. Cl.
B60T 17/22 (2006.01)
F16D 65/18 (2006.01)
F16D 65/46 (2006.01)
*F16D 55/226* (2006.01)
*F16D 65/38* (2006.01)
*F16D 66/00* (2006.01)
*F16D 121/24* (2012.01)
*F16D 125/40* (2012.01)
*F16D 125/48* (2012.01)

(52) U.S. Cl.
CPC ............ F16D 65/46 (2013.01); *F16D 55/226* (2013.01); *F16D 2065/386* (2013.01); *F16D 2066/005* (2013.01); *F16D 2121/24* (2013.01); *F16D 2125/40* (2013.01); *F16D 2125/48* (2013.01)

(58) Field of Classification Search
CPC ...... F16D 2125/405; B60T 1/065; B60T 8/17; B60T 13/746; B60T 17/22
See application file for complete search history.

(56) References Cited

U.S. PATENT DOCUMENTS

| | | | |
|---|---|---|---|
| 2016/0355169 A1* | 12/2016 | Ohlig | B60T 13/741 |
| 2019/0331180 A1* | 10/2019 | Chelaidite | F16H 25/24 |
| 2022/0024434 A1* | 1/2022 | Baek | F16D 65/183 |
| 2022/0235839 A1* | 7/2022 | Baek | F16D 65/0081 |
| 2022/0242384 A1* | 8/2022 | Baek | B60T 17/221 |
| 2022/0260125 A1* | 8/2022 | Tarandek | B60T 1/065 |
| 2022/0324427 A1* | 10/2022 | Puiu | F16D 65/18 |
| 2023/0062142 A1* | 3/2023 | Song | F16D 65/183 |
| 2023/0258237 A1* | 8/2023 | Park | B60T 13/741 188/71.1 |
| 2023/0271596 A1* | 8/2023 | Jung | F16D 65/183 |
| 2023/0287949 A1* | 9/2023 | Baek | B60T 13/746 |
| 2024/0328472 A1* | 10/2024 | Jedele | F16D 65/18 |

* cited by examiner

ELECTROMECHANICAL BRAKE AND OPERATING METHOD THEREOF

CROSS-REFERENCE TO RELATED APPLICATION

This application is based on and claims priority under 35 U.S.C. § 119 to Korean Patent Application No. 1020220026028, filed on Feb. 28, 2022 in the Korean Intellectual Property Office, the disclosures of which are incorporated herein by reference.

TECHNICAL FIELD

The present disclosure relates to an electromechanical brake and an operation method thereof, and more particularly, to an electromechanical disk brake that implements braking of a vehicle using a rotational driving force of a motor and an operating method thereof.

BACKGROUND

Vehicles are essentially equipped with brake systems for carrying out braking, and various types of brake systems have been proposed for the safety of drivers and passengers.

A conventional brake system mainly uses a system in which a hydraulic pressure required for braking is supplied to a wheel cylinder by using a mechanically connected booster when a driver depresses a brake pedal. Today, however, as a next-generation brake system, an electromechanical brake system has been developed in which a driver's braking event is transmitted by an electric signal, and based on this, a transmission such as a motor is operated to provide a braking force of a vehicle.

Such an electromechanical brake system converts a rotational force of a motor into linear movement through a motor, a speed reducer, or the like to provide a clamping pressure of a brake disk, thereby performing a service brake and a parking brake of a vehicle.

Meanwhile, a brake pad that directly contacts and presses against a brake disk of a vehicle is gradually worn with repeated braking operations of the vehicle. In order to maintain the braking performance of a vehicle despite the wear of a brake pad, it is necessary to implement compensation for the brake pad wear, but in this case there is a problem that the size or axial length of a brake system increases and the usability of the vehicle deteriorates.

SUMMARY

The present embodiment is to provide an electromechanical brake and an operating method thereof that can maintain and improve the braking performance of a vehicle despite wear of a brake pad.

The present embodiment is to provide an electromechanical brake and an operating method thereof that can make it possible to compensate for wear of a brake pad in conjunction with parking brake force implementation.

The present embodiment is to provide an electromechanical brake and an operating method thereof that can reduce the electric length and the stroke distance during a braking operation, as well as reduce the size and weight, improve the applicability of a vehicle, and achieve space utilization of the vehicle.

The present embodiment is to provide an electromechanical brake and an operating method thereof that can easily compensate for wear of a brake pad by a simple structure.

According to an aspect of the present disclosure, there may be provided an electromechanical brake including: a piston which is provided to be capable of advancing and retreating to press a pad plate; a power conversion unit including a spindle which rotates by receiving a driving force from an actuator, and a nut which is connected to the spindle and advances or retreats by rotation of the spindle in a first direction or a second direction; and a positioning portion which is screwed with a thread formed inside the piston, receives a rotational force from a drive motor, linearly moves according to rotational movement, and adjusts a relative position of the piston with respect to the power conversion unit, wherein the positioning portion includes a first screw provided on an outer surface of one side of the nut and having, on an outer peripheral surface, a first thread that meshes with the thread, a second screw provided on an outer side surface of the other side of the nut and having, on an outer peripheral surface, a second thread that meshes with the thread, a first gear provided to rotate together with the second screw by receiving the rotational force from the drive motor, and an interlocking member provided between the first screw and the second screws to interlock and linearly move the first and second screws by the rotation of either the first screw or the second screw and adjust a relative position with the piston.

A second gear provided on a motor shaft of the drive motor and meshing with the first gear may be further provided, and the first gear may be provided as a wheel gear having a gear tooth formed on an outer peripheral surface thereof so as to mesh with the second gear.

The first gear moves together during linear movement of the second screw and may be rotatably supported on the spindle.

The first screw and the second screw may be arranged to contact each other.

The interlocking member may include: a receiving groove formed on one surface of the first screw or the second screw that faces each other; a first return spring inserted into the receiving groove, one end of which is supported by the first or second screw; a second return spring introduced into the receiving groove, the other end of which is supported on the first or second screw; and a pressing projection formed on the second or first screw opposite to the receiving groove, and interposed between the first and second return springs.

The first screw or the second screw may be rotated and be linearly moved by the resilient force of the first return spring or second return spring that the pressing projection compresses, so as to interlock with the first direction rotation or second direction rotation.

The pressing projection may be provided to have a length longer than the linear movement distance of the first screw or the second screw.

The first screw may be provided in a hollow cylindrical shape so as to surround a part of a front side of the nut, and the first screw and the nut may each have an anti-rotation surface at least partially provided as a flat surface at a region contacting each other.

The spindle may further include a flange radially expanded on an outer peripheral surface of the spindle, and a thrust bearing contacting the flange and supporting an axial force.

An internal thread may be formed on an inner peripheral surface of the nut, the spindle may include a first end portion on one side of which an outer peripheral surface has an external thread that meshes with the internal thread, a second end portion at the other side thereof that is connected to the actuator, and a central portion between the first and second end portions, and the flange may be fixedly installed on the outer periphery surface of the central portion.

An electronic control unit that controls operations of the actuator and the drive motor, and a sensing portion that measures a fastening force between the pad plates and a disk that rotates with a wheel may be further included.

According to another aspect of the present disclosure, there may be provided a method of operating the electromechanical brake as described above, including: performing a braking operation of a vehicle by advancing or retreating the piston through the power conversion unit that receives a driving force from the actuator and converts a rotational force into linear movement; and when switching to a parking brake operating mode, transmitting power of the drive motor to the positioning portion to adjust a relative position with the piston, and simultaneously performing a parking braking operation and a thruster function.

During a parking braking operation, a first gear and a second screw to which a rotational force is transmitted from the drive motor may rotate together and linearly move in a direction away from a disk, the first screw may be rotated and linearly moved in conjunction with the second screw, and the first screw may be operated after a load corresponding to a parking braking force is generated on the second screw.

In a state where the parking braking is completed, the power conversion unit may be operated in the braking direction of a vehicle through the actuator to release the parking brake.

When the parking brake is released, the actuator may operates the power conversion unit in the braking direction of a vehicle, wherein the nut and the first screw may rotate together and linearly move in a direction approaching a disk, and the second screw may rotate and linearly move in conjunction with the first screw.

The first screw can rotate and move linearly with the nut until a point of transformation from an unloaded section to a loaded section.

The actuator may be operated up to a point in time when the first screw is transformed from an unloaded section to a loaded section.

The electromechanical brake and the operating method thereof according to the present embodiment can maintain and improve the braking performance of a vehicle despite wear of a brake pad.

The electromechanical brake and the operating method thereof according to the present embodiment can simultaneously implement a wear compensation operation of a brake pad together with the implementation of a parking brake force to improve operability.

The electromechanical brake system and the operating method thereof according to the present embodiment can reduce the electric length and the stroke distance during a braking operation, and also reduce the size and the weight, thereby improving the applicability of a vehicle, and achieving space utilization.

The electromechanical brake system and the operating method thereof according to the present embodiment can easily compensate for wear of a brake pad by a simple structure.

BRIEF DESCRIPTION OF THE DRAWINGS

The disclosure will now be described in detail by the following drawings, which show a preferred embodiment of the disclosure and are not to be construed as limiting the technical idea of the present disclosure thereto. Embodiments will be more clearly understood from the following detailed description taken in conjunction with the accompanying drawings in which.

DETAILED DESCRIPTION

Figure 1:
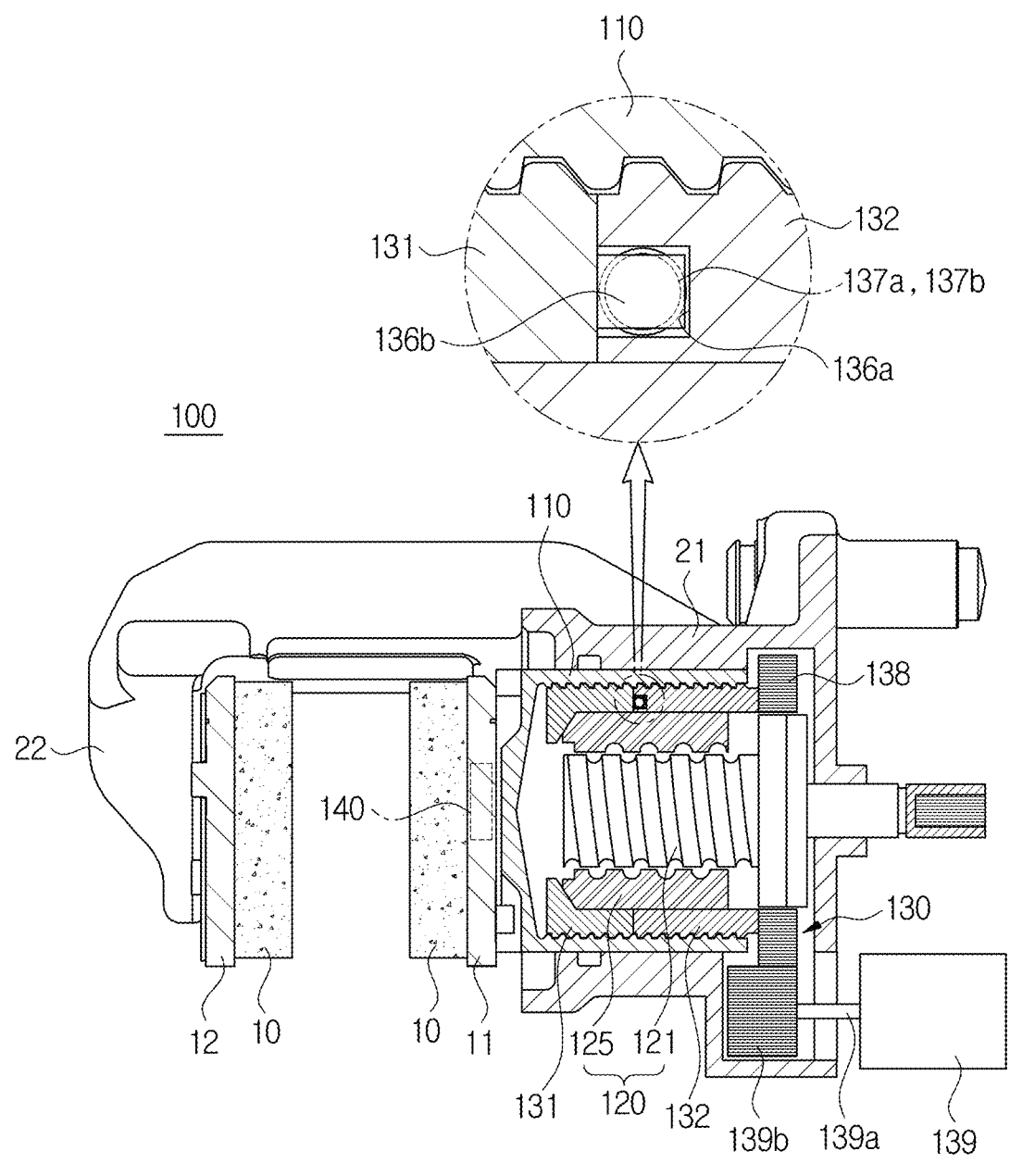
FIG. 1 is a side cross-sectional view showing an electromechanical brake according to an embodiment of the present disclosure.

Hereinafter, embodiments of the present disclosure will be described in detail with reference to the accompanying drawings. The following embodiments are presented to fully convey the spirit of the disclosure to those skilled in the art. The present disclosure is not limited to the embodiments described herein, but may be embodied in other forms. In the drawings, illustration of parts not associated with the description may be omitted to clarify the disclosure, and the size of the components may be somewhat exaggerated to facilitate understanding.

Figure 2:
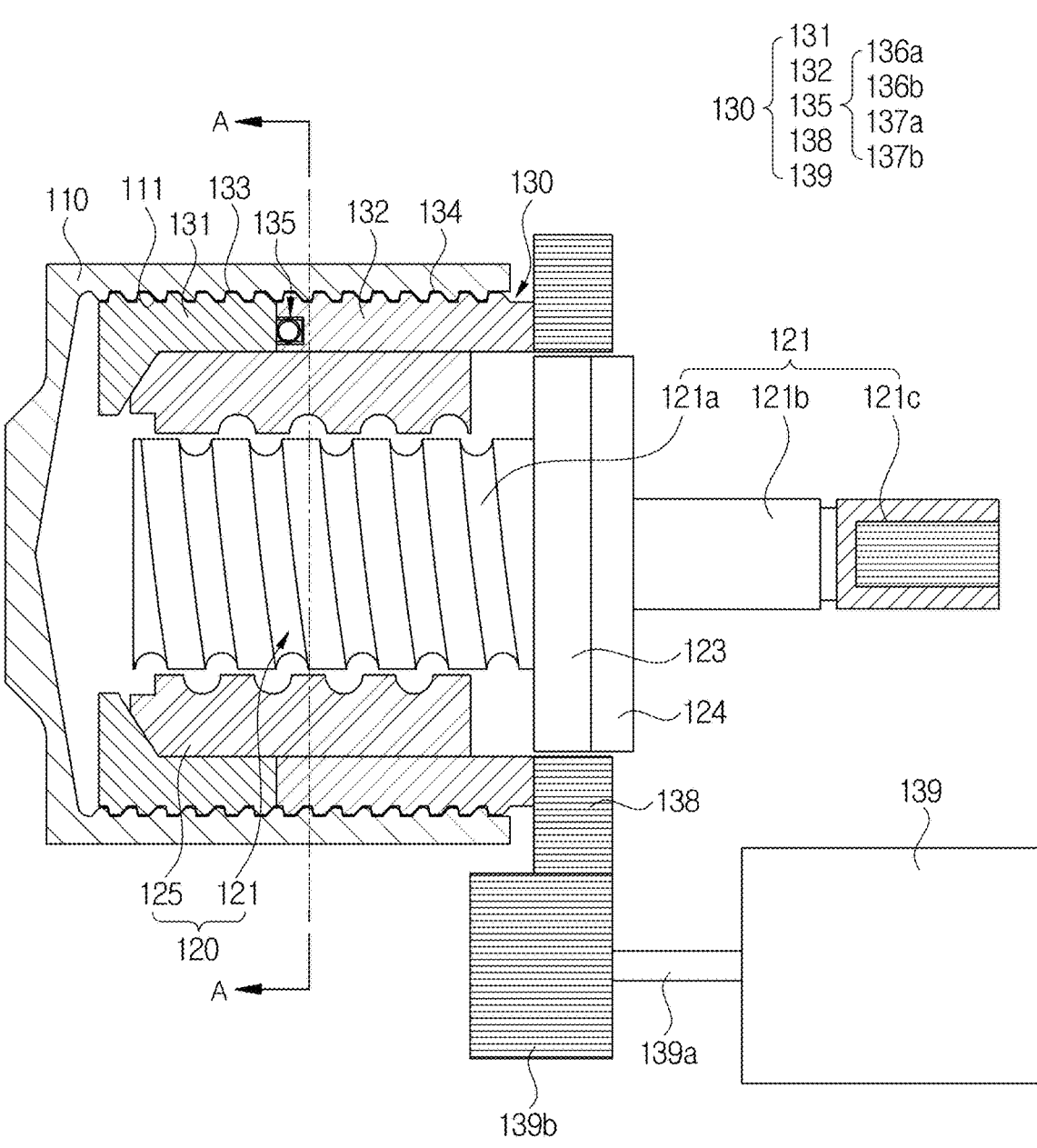
FIG. 2 is an enlarged side cross-sectional view of an essential part of an electromechanical brake according to an embodiment of the present disclosure.
Figure 3:
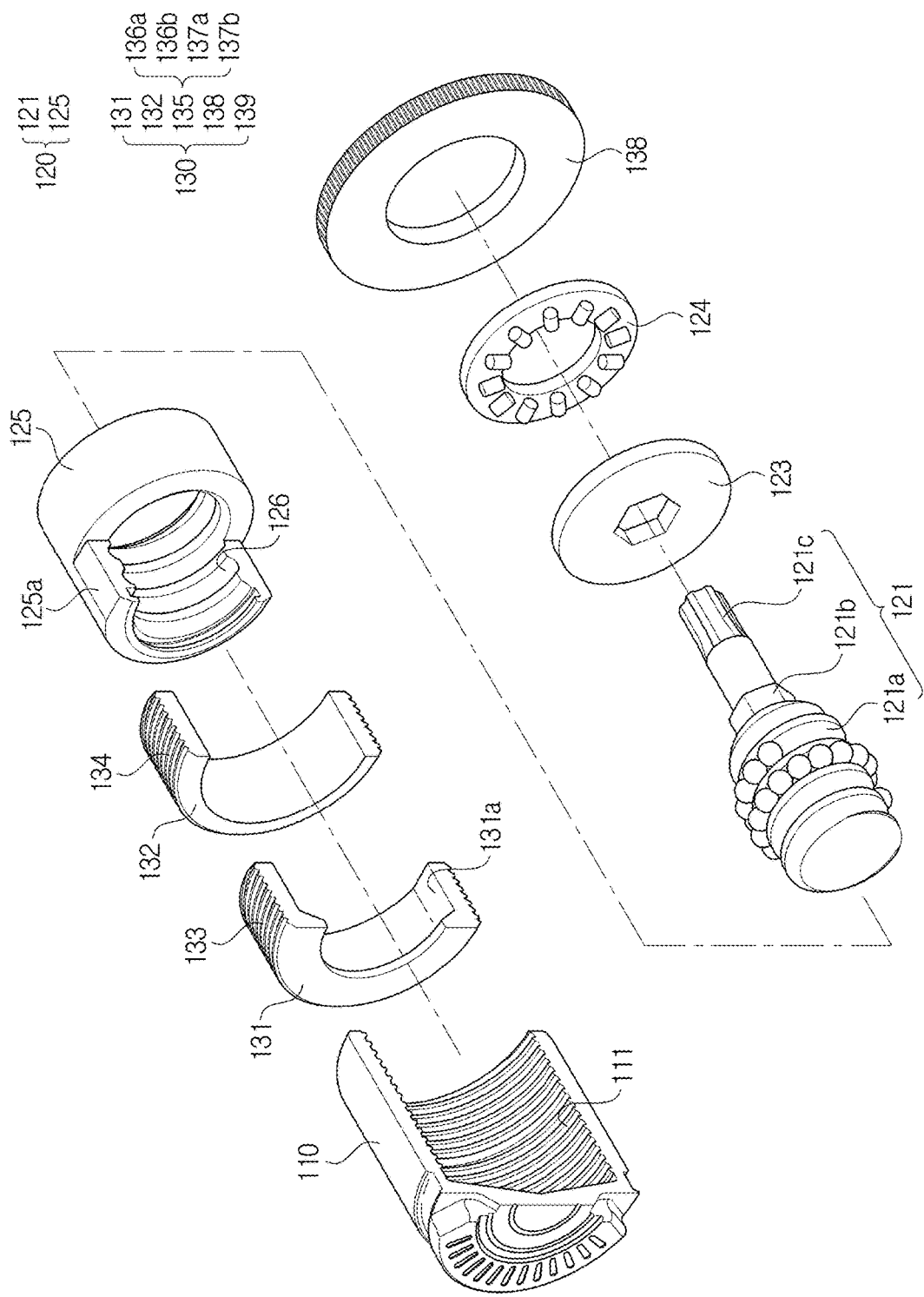
FIG. 3 is an exploded perspective view showing an essential part of an electromechanical brake according to an embodiment of the present disclosure.
Figure 4:
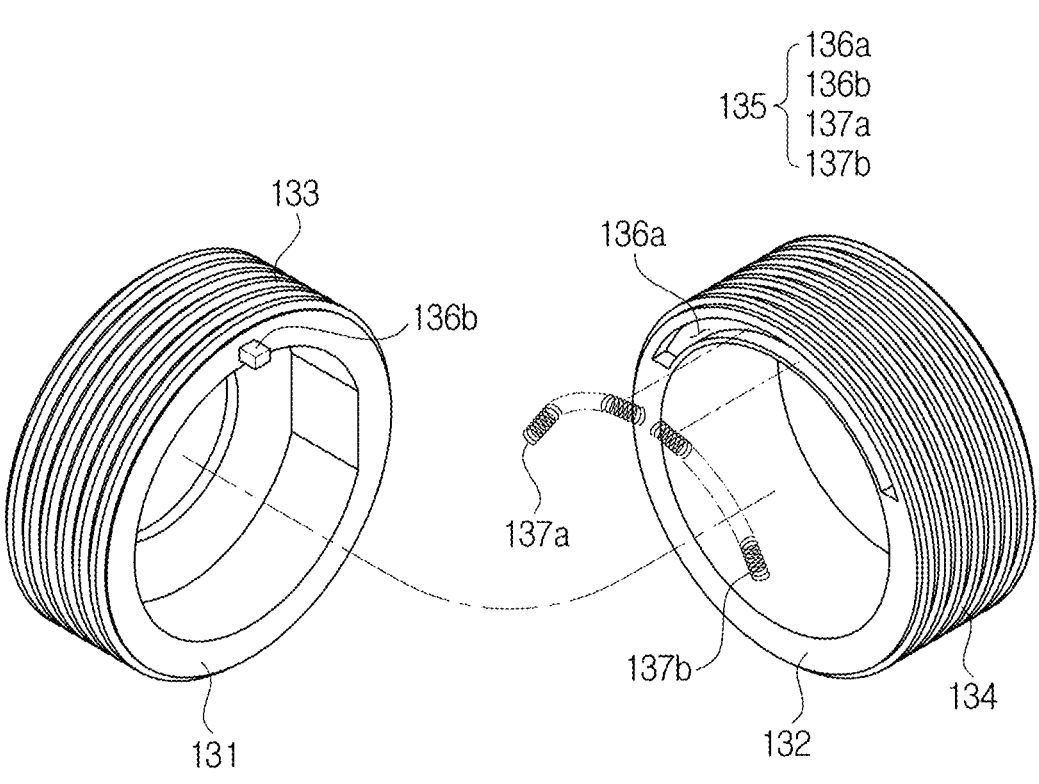
FIG. 4 is an exploded perspective view showing details of a positioning portion provided in an electromechanical brake according to an embodiment of the present disclosure.
Figure 5:
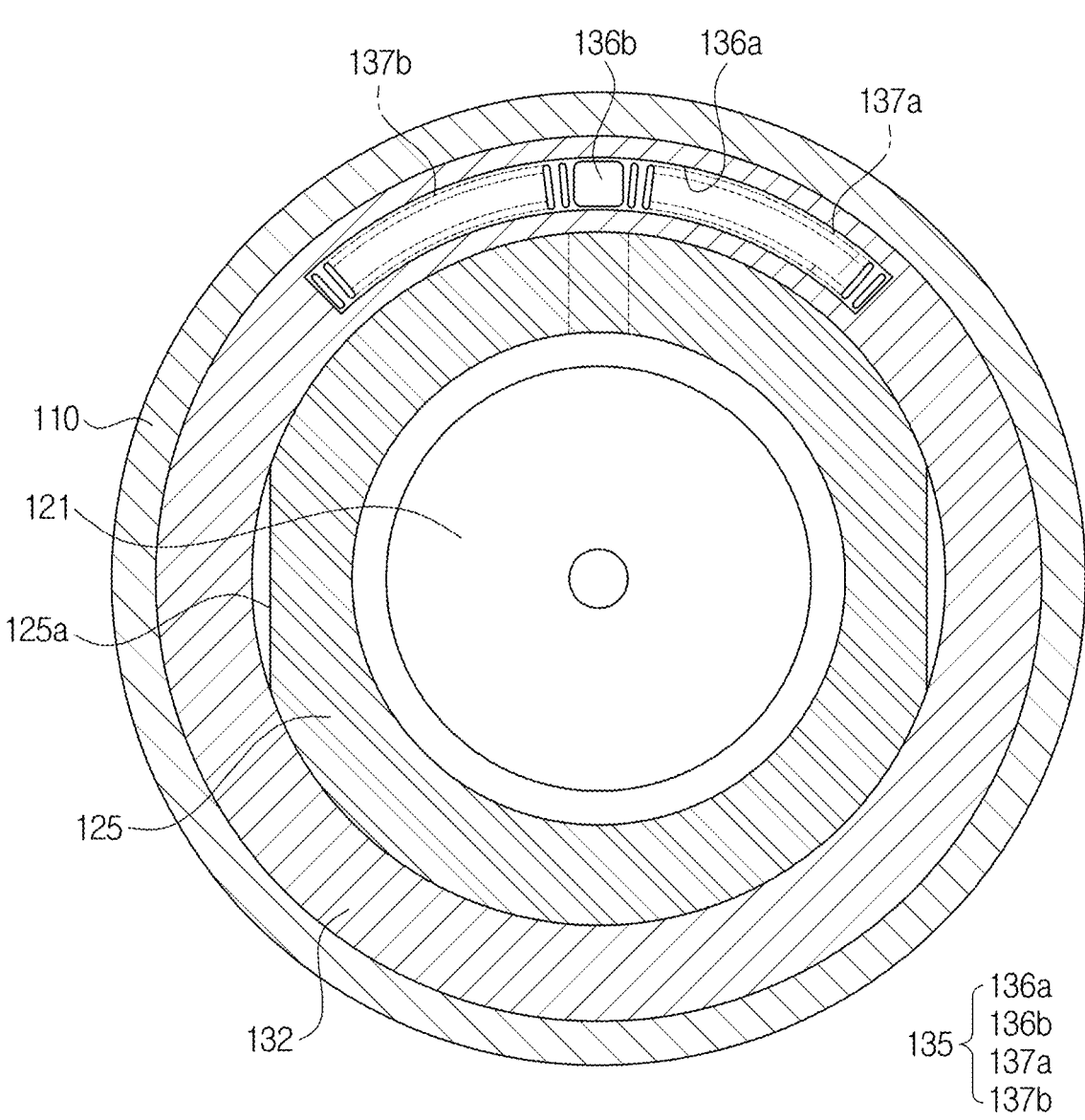
FIG. 5 is a cross-sectional view taken along line A-A' in FIG. 2.

FIG. 1 is a side cross-sectional view showing an electromechanical brake according to an embodiment of the present disclosure, FIG. 2 is an enlarged side cross-sectional view of an essential part of an electromechanical brake according to an embodiment of the present disclosure, FIG. 3 is an exploded perspective view showing an essential part of an electromechanical brake according to an embodiment of the present disclosure, FIG. 4 is an exploded perspective view showing details of a positioning portion provided in an electromechanical brake according to an embodiment of the present disclosure, and FIG. 5 is a cross-sectional view taken along line A-A' in FIG. 2.

Referring to FIGS. 1 to 5, an electromechanical brake 100 according to the present embodiment may include: a carrier (not shown) on which a pair of pad plates 11, 12 are mounted to press a disk (not shown) rotating together with a wheel of a vehicle; a caliper housing 20 slidably installed on the carrier to operate the pair of pad plates 11, 12; a piston 110 provided inside the caliper housing 20 to be able to advance and retreat; an actuator (not shown) for generating and providing a driving force for moving the piston 110; a power conversion unit 120 for implementing axial advancing and retreating movement of the piston 110 by receiving a rotational driving force provided by the actuator, converting the rotational driving force to linear movement, and transmitting the linear movement to the piston 110, a positioning portion 130 for compensating the implementation of a parking braking force and the wear of the brake pad 10 by receiving a rotational force from a drive motor 139 and adjusting a relative position of the piston 110 with respect to the power conversion unit 120, a sensing portion 140 for measuring a close contact force between the disk and the brake pad 10 or a fastening force of the braking pad 10, and an electronic control unit (not shown) for controlling operations of the actuator and drive motor, based on information provided from the sensing portion.

The pair of pad plates 11, 12 are each provided with a brake pad 10 attached to an inner surface thereof. The pair of pad plates 11, 12 include an inner pad plate 11 arranged so that the outer surface thereof is in contact with the front surface (left side surface with reference to FIG. 1) of the piston 110, and an outer pad plate 12 arranged so that the outer surface thereof is in contact with a finger portion 22 of the caliper housing 20, and are slidably installed on the carrier.

The caliper housing 20 includes a finger portion 22 for operating the outer pad plate 12, and a cylinder portion 21 provided with a piston 110, and is slidably fastened to the carrier. As the caliper housing 20 slides from the carrier and moves to the disk side by the reaction force caused by the movement of the piston 110 during braking of a vehicle, the outer pad plate 12 may approach the disk and press the disk by the finger portion 22.

The piston 110 may be provided in a cup shape with the rear sides (right sides in FIGS. 1 and 2) open and slidably inserted inside the cylinder portion 21. Further, the piston 110 may receive power through an actuator (not shown) and a power conversion unit 120 described later to press the inner pad plate 11 toward the disk. On the inner peripheral surface of the piston 110, a thread 111 may be formed to be screwed with a first screw 131 and a second screw 132 described later. Ab operation of adjusting a relative position of the piston 110 with respect to the power conversion unit 120 by the positioning portion 130 will be described again below.

The power conversion unit includes: a spindle 121 configured to rotate by receiving a driving force from an actuator; a nut disposed inside a piston 110, screwed with the spindle 121, and configured to advance together with the piston 110 when the spindle 121 is rotated in a first direction, and to retreat together with the piston 110 when the spindle 121 is rotated in a second direction; and a plurality of balls (not shown) interposed between the spindle 121 and the nut 125. This power conversion unit 120 may be provided in a ball screw type conversion device for converting the rotation of the spindle 121 into linear movement.

The rotation of the spindle 121 in the first direction means the rotational direction in which the nut 125 is advanced by the rotation of a spindle 121, and the rotation of the spindle 121 in the second direction means a rotational direction which is opposite to the first rotational direction and which retreats the nut 125 by the rotation of the spindle 121.

The spindle 121 may be divided into a first end portion 121a on one side where the external thread is formed, a second end portion 121c on the other side which is connected to the actuator and receives the driving force, and a central portion 121b located between the first and second end portions 121a, 121c. Further, at the spindle 121, a flange 123 provided at the central portion 121b, and a thrust bearing 124 which is in contact with the flange 123 and supports an axial force generated during a braking operation may be provided.

The nut 125 may be formed in a hollow cylindrical shape such that the first end portion 121a of the spindle 121 is inserted into the nut 125, and the inner peripheral surface may be provided with an external thread 122 of the spindle 121 and an internal thread 126 meshing therewith through a ball (not shown). Further, outside the nut 125, a first screw 131 and a second screw 132 described later may be provided so as to surround the outer peripheral surface of the nut 125. The outer peripheral surface of the nut 125 may be provided with an anti-rotation surface 125a, at least a portion of which is formed in a plane to prevent relative rotation with the first screw 131. Since the ball screw type power conversion device 120 is a well-known technology already widely applied, a detailed description of an operation is omitted.

An actuator (not shown) may be provided including a motor and a speed reducer having a plurality of reduction gears, and may be supplied with power from a power supply arranged in a vehicle to generate and provide a driving force. The actuator may be coupled to the second end portion 121c of the spindle 121 to transmit the generated driving force to the rotational movement of the spindle 121. The actuator may be installed on the outside of the caliper housing 20, and the speed reducer may be provided with devices of various structures such as a worm structure or a planetary gear assembly to supply the power of the motor to the spindle 121 after reducing the power.

The positioning portion 130 may adjust a relative position of the piston 110 with respect to the power conversion unit 120. For example, the positioning portion 130 may implement a parking braking force or may advance the relative position of the piston 110 to compensate for wear of the brake pad 10.

The positioning portion 130 may include: a first screw 131 provided on one side outer surface of the nut 125 and configured to rotate together with the nut 125; a second screw 138 provided on the other side outer surface of the nut 125; a first gear 138 configured to receive a rotational force from a drive motor 139 and configured to rotate with the second screw 132; and an interlocking member 135 provided between the first and second screws 131, 132 to linearly move the first or second screws 131, 132 in an interlocking manner by rotating the first screw 131 or the second screw 132 and adjust a relative position with the piston 110.

The rotation of the positioning portion 130 in the first direction of the first screw 131 or the second screw 132, which will be described later, means a rotational direction away from the disk, and the rotation in the second direction means a rotational direction toward the disk.

Figure 6:
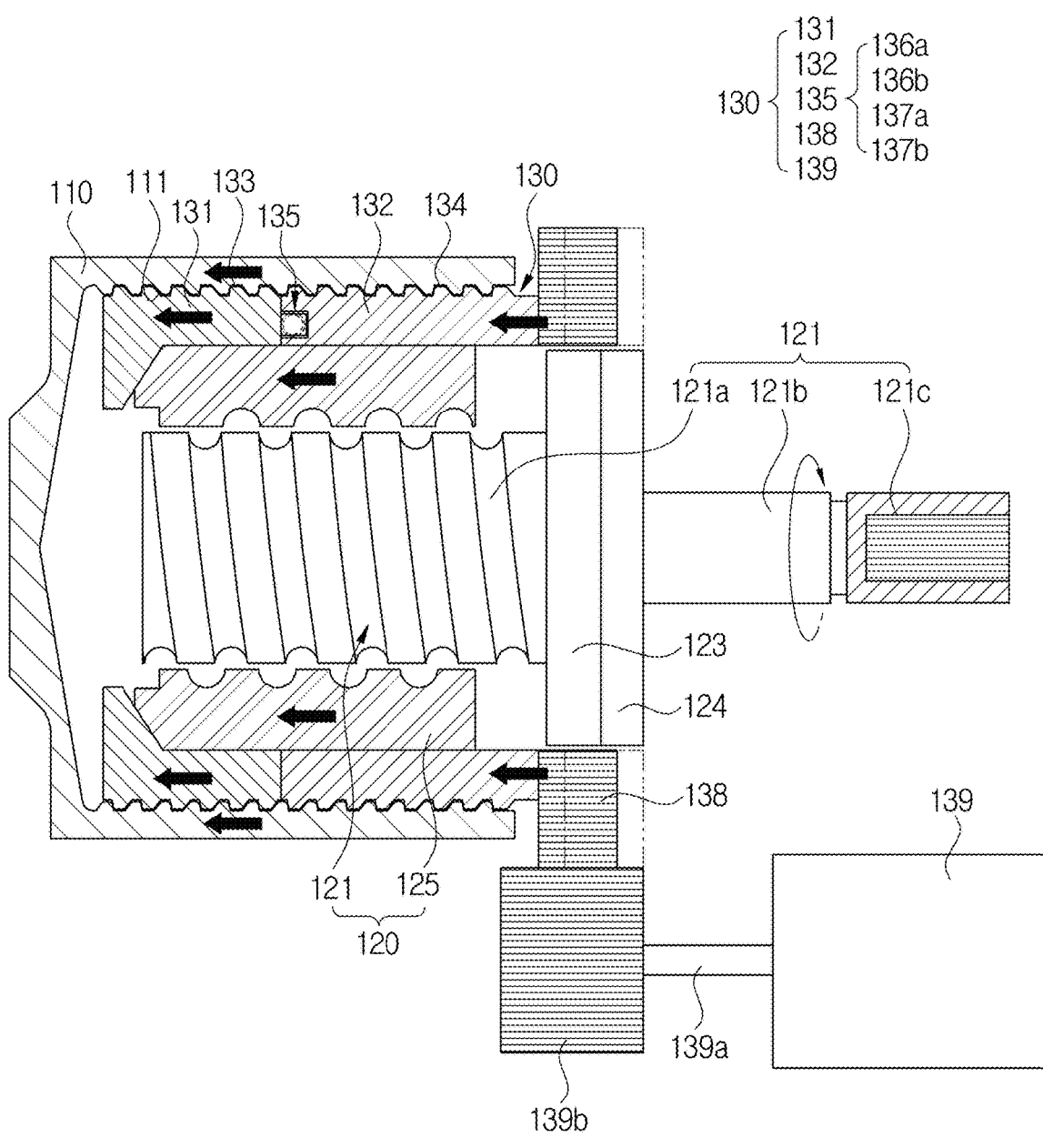
FIG. 6 is a side cross-sectional view showing a state in which an electromechanical brake according to an embodiment of the present disclosure performs a braking operation.

The first screw 131 may be provided in a hollow cylindrical shape so as to surround a front portion of the nut 125. The outer peripheral surface of the first screw 131 is provided with a first thread 133 that meshes with a thread 111 formed on an inner peripheral surface of the piston 110. The first screw 131 rotates together with the nut 125, and at the same time, an anti-rotation surface 131a may be formed, in which at least a part of an inner peripheral surface in contact with the nut 125 is formed as a plane, so as to prevent relative rotation. At this time, the frictional force due to the engagement between the first thread 133 of the first screw 131 and the thread 111 of the piston 110 is set to be greater than that between the spindle 121 and the nut 125 coupled through a ball. Therefore, the first screw 131 receives the power through the actuator, and the nut 125 is prevented from rotating even when the spindle 121 is rotated during general braking of a vehicle. Thus, as shown in FIG. 6, when the nut 125 is linearly moved, the first and second screws 131, 132 are screwed with the piston 110, and thus the nut 125, the piston 110, the first screw 131, the second screw 132, and the first gear 138 coupled to the second screw 132 are linearly moved together. That is, the nut 125, the piston 110, the first screw 131, the second screw 132, and the first gear 138 may advance together during braking of a vehicle, or the nut 125, the piston 110, the first screw 131, the second screw 132, and the first gear 138 may retreat together when braking of the vehicle is released.

The second screw 132 may be provided in a hollow cylindrical shape so as to be in contact with the first screw 131 and surround a rear portion of the nut 125. The second screw 132 has an outer peripheral surface provided with a second thread 134 which meshes with a thread 111 formed on the inner peripheral surface of the piston 110. At this time, unlike the first screw 131, the second screw 132 is provided in a structure that does not rotate together with the nut 125. That is, the second screw 132 is provided so as not to interfere with the rotation of the nut 125.

This second screw 132 is coupled to the first gear 138 and may be rotated by receiving a rotational force from the drive motor 139. That is, the second screw 132 is provided to rotate and linearly move with the first gear 138. At this time, although the second screw 132 and the first gear 138 are shown and described as being separately provided and coupled, the present disclosure is not limited thereto, and the second screw 132 and the first gear 138 may be provided integrally.

The first gear 138 is rotatably supported on the spindle 121 and is coupled to the second screw 132. As shown, the first gear 138 may be disposed on an outer surface of the thrust bearing 124 and the flange 123 coupled to the spindle 121. The first gear 138 may be provided as a wheel gear having outer peripheral surface on which a gear tooth is formed so as to mesh with a second gear 139b provided on the motor shaft 139a of the drive motor 139. At this time, the second gear 139b may have a longer length than the first gear 138. This is to prevent the first gear 138 from being disengaged from the second gear 139b as the first gear 138 is linearly moved with the second screw 132.

In addition, the power conversion unit 120 and the positioning portion 130 may be embedded in the cylinder portion 21 of the caliper housing 20, and the first gear 138 and the second gear 139b may be coupled to each other by processing a hole in the cylinder portion 21 to install the second gear 139b.

Meanwhile, the drive motor 139 is provided for providing a parking braking force and may be operated to generate power when the parking braking force is implemented. According to the present disclosure, by transmitting the power to the drive motor 139 in the braked state through the actuator, it is possible to provide the power required for the parking brake even if the drive motor 139 is provided as a small motor having a low output load. Accordingly, it is possible to minimize the cost and weight of the drive motor 139.

The interlocking member 135 is provided between the first screw 131 and the second screw 132, and is configured to interlock the first and second screws 131, 132 with each other by rotation of the first screw 131 or the second screw 132 to cause linear movement. Through this operation of the interlocking member 135, it is possible to simultaneously implement the parking brake force and the compensation according to the wear of the brake pad 10.

More specifically, the interlocking member 135 may include a receiving groove 136a formed on one surface of the first screw 131 or the second screw 132 facing each other, a first return spring 137a and a second return spring inserted into the receiving groove 136a, and a pressing projection 136b formed on the first screw 131 or the second screw 132 facing the receiving groove 136a and interposed between the first and second return springs 137a, 137b. According to the drawings, the receiving groove 136a is provided on the second screw 132, and the pressing projection 136b is provided on the first screw 131; however, conversely, it is also possible to provide the pressing projection 136a on the second screw 132 and provide the receiving groove 136a on the first screw 131. That is, even if the receiving groove 136a and the pressing projection 136b are formed opposite to those shown, the function and operation structure thereof are the same, and thus a description thereof will be made as shown in the drawings.

The first and second return springs 137a, 137b are inserted into the receiving groove 136a at a certain interval. That is, one end of the first return spring 137a and the opposite end of the second return spring 137b inserted into the receiving groove 136a are supported by both ends of the receiving groove 136a, respectively, and the opposite end of the first return spring 137a and one end of the second return spring 137b are supported by the pressing projection 136b. The first and second return springs 137a, 137b may be compressed between the receiving groove 136a and the pressing projection 136b by rotating the first screw 131 or the second screw 132. As a result, the first screw 131 or the second screw 132 moves linearly by the resilient force due to the compression. The rotation and linear movement of the first screw 131 and the second screw 132 will be described later.

Meanwhile, the first screw 131 and the second screw 132 are provided in separate structures to perform separate operations, but may be interlocked and operated by the interlocking member 135 through the return springs 137a, 137b when the first screw 131 or the second screw 132 is operated. When the relative position of the first screw 131 or the second screw 132 with respect to the piston 110 is adjusted during the rotation and linear movement, either the first screw 131 or the second screw 132 moves first and a gap is generated between the first screw 131 and second screw 132. Accordingly, the length of the pressing projection 136b may be longer than the linear movement distance of the first screw 131 or the second screw 132 so that the pressing projection 136b is not disengaged from the receiving groove.

The sensing portion 140 is provided to measure a close contact force or a fastening force between the disk and the brake pad 10. The sensing portion 140 may be provided as a spindle 121 or a force sensor for sensing a load of an actuator and measuring a fastening force between the disk and the brake pad 10, but the present disclosure is not limited to such a device. The sensing portion 140 sends out the measured fastening force information of the brake pad 10 to the electronic control unit, and the electronics control unit may determine wear, drag, or the like of the brake pad 10, based on the fastening force information measured by the sensing portion 140. Here, the sensing portion 140 is shown as being provided on the pad plate 11, but the present disclosure is not limited thereto, and may be provided on a power conversion unit 120 or an actuator that receives a reaction force when the pad plates 11, 12 are pressed.

Hereinafter, a method of operating the electromechanical brake 100 according to the present embodiment will be described.

First, a state in which the electromechanical brake device according to the present embodiment performs a braking operation will be described.

Referring to FIGS. 2 and 6, FIG. 2 is a state in which the braking operation is not performed and a state in which the braking is released, and FIG. 6 is a state in which the braking operation is performed for a general service brake of a vehicle.

Specifically, when a driver applies a stepping force to a brake pedal (not shown) for braking a vehicle, a pedal displacement sensor (not shown) detects the driver's intention of braking as an electric signal and sends the electric signal to an electric control unit. Based on this, the electronic control unit controls the operation of the actuator, thereby bringing the disk and the brake pad 10 into close contact with each other to implement braking of the vehicle.

During braking of the vehicle, the actuator operates to rotate the spindle 121 in the first direction, and the nut 125 advances and the piston 110 also advances toward the inner pad plate 11 in accordance with the first direction rotation of the spindle 121. The brake pad 10 mounted on the inner pad plate 11 approaches and adheres to the disk to generate a fastening force, thereby generating braking of a vehicle.

At this time, the nut 125 is provided so as to rotate together with the first screw 131 through the anti-rotation surface 125*a*, but the friction force between a screwing portion of the first screw 131 and the piston 110 is larger than the friction force between the spindle 121 and the nut 125, thereby limiting the rotation of the nut 125. As a result, since the rotation of the nut 125 is limited, the nut 125 advances toward the disk in accordance with the rotation of the spindle 121 in the first direction. When the first and second screws 131, 132 are screwed with the piston 110, the first screw 131, the second screw 132, and the first gear 138 are linearly moved together when the nut 125 is linearly moved.

When the vehicle is released from braking, the actuator operates to rotate the spindle 121 in the second direction, and the nut 125 retreats and the piston also retreats from the pad plate together with the rotation of the spindle 121 in the second direction. At this time, the first screw 131, the second screw 132, and the first gear 138 are retreated together with the retreating of the nut 125.

Meanwhile, the electromechanical brake 100 according to the present disclosure is switched from a braking state of a vehicle into a parking brake operating mode.

Figure 7:
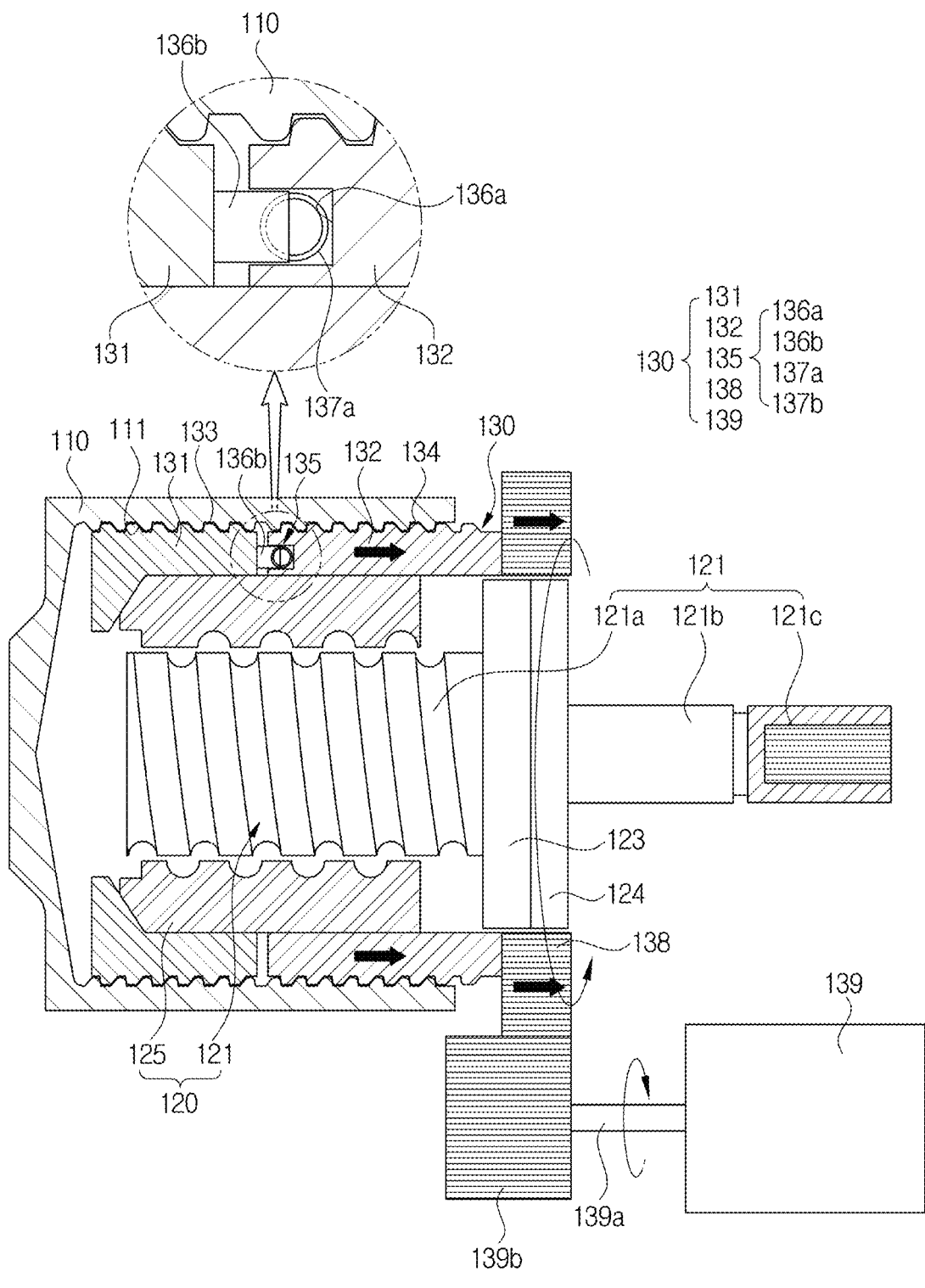
FIGS. 7 and 8 are side cross-sectional views showing, in steps, a state in which an electromechanical brake according to an embodiment of the present disclosure implements a parking braking force in a braking state.
Figure 8:
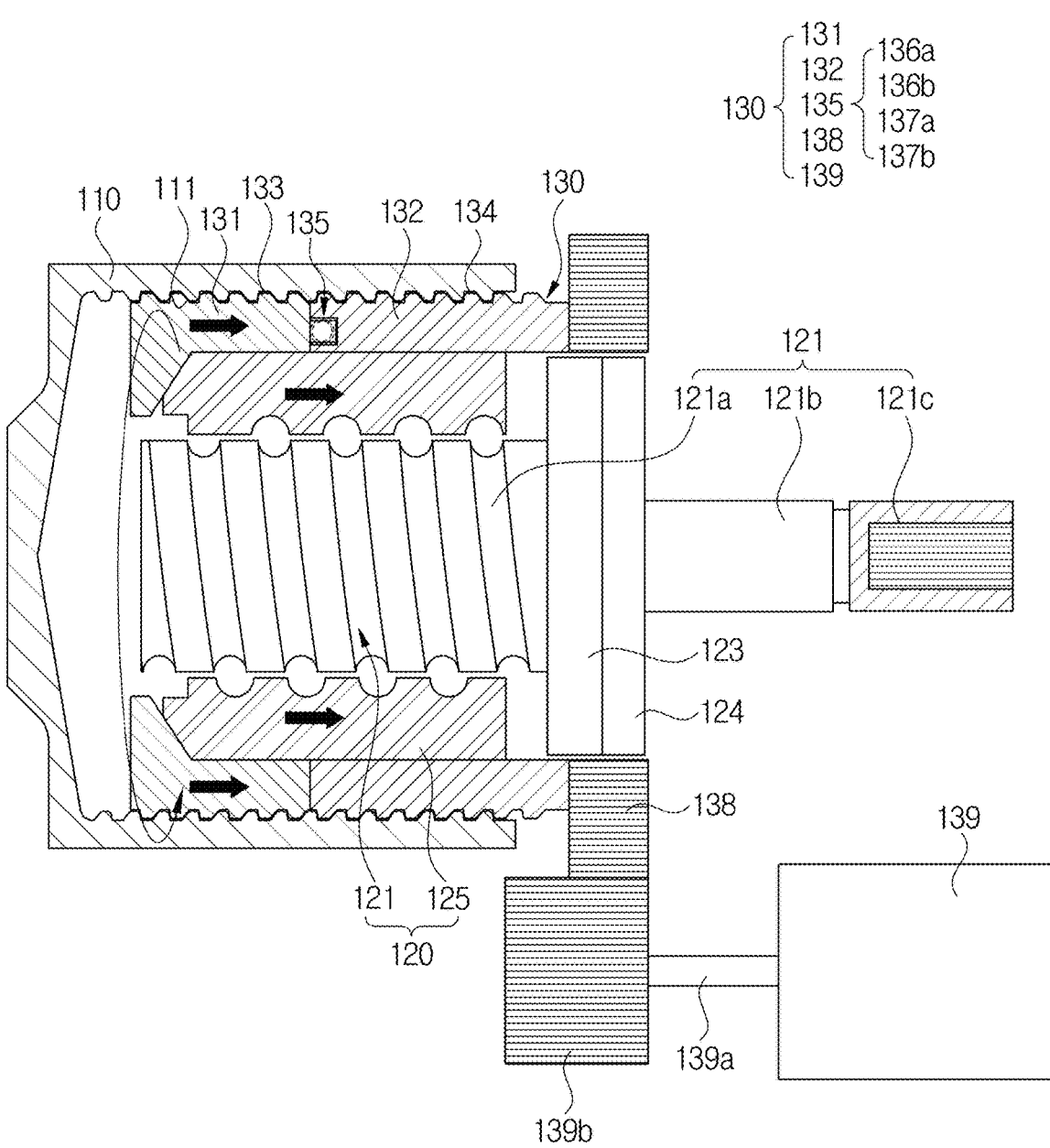
Figure 9:
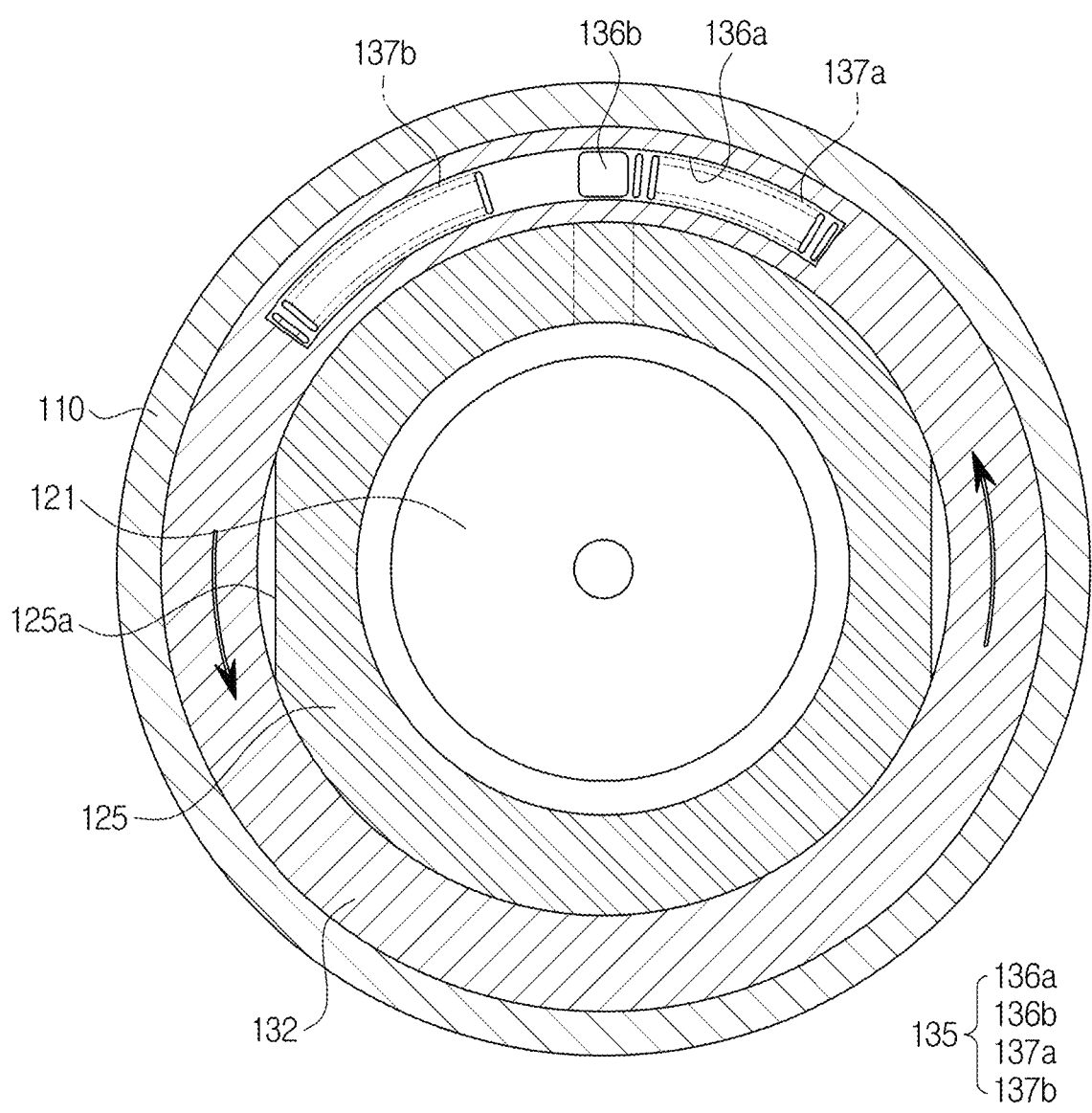
FIGS. 9 and 10 show, in steps, an operating state of an interlocking member when an electromechanical brake according to an embodiment of the present disclosure implements a parking brake force.
Figure 10:
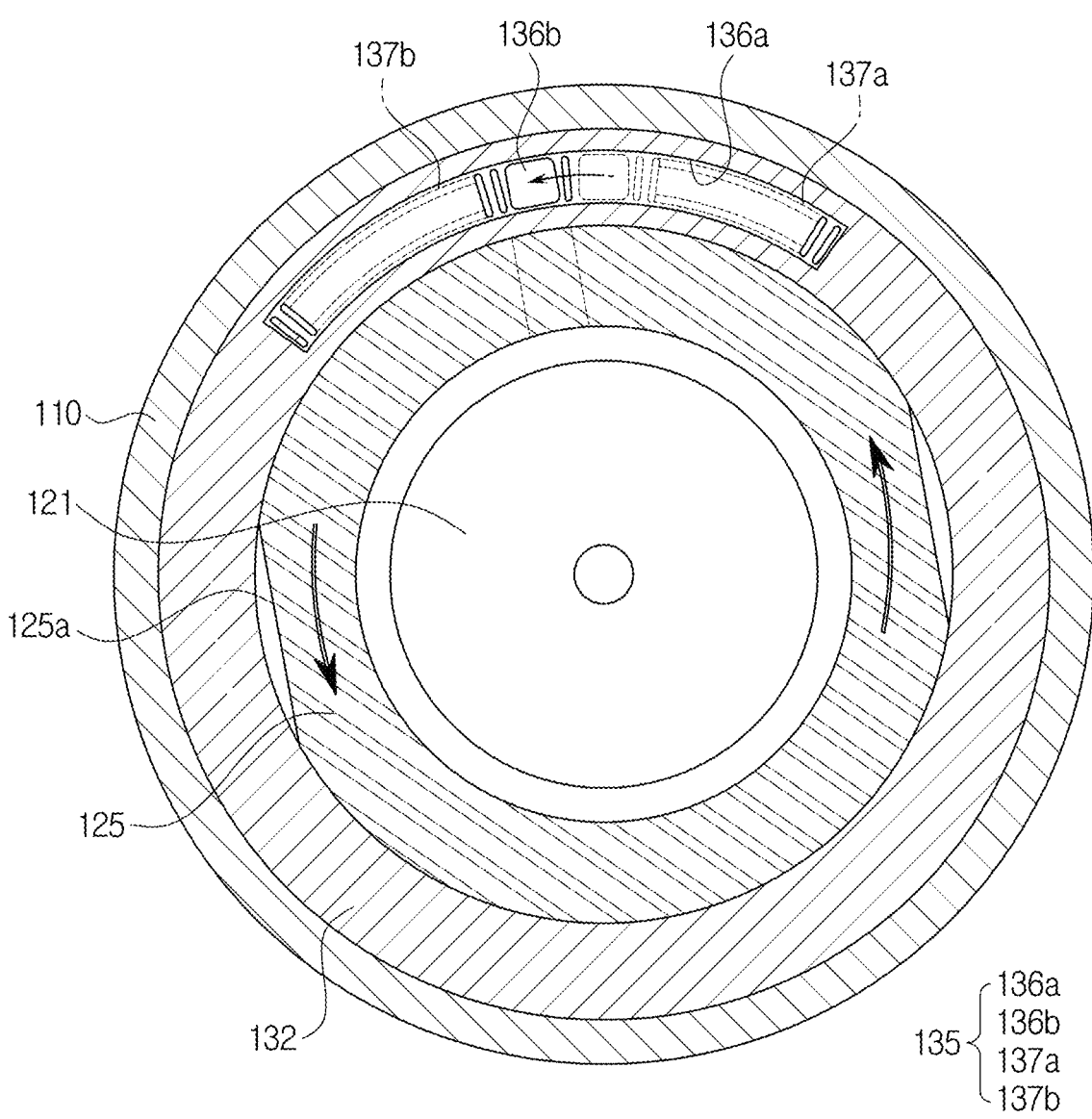

FIGS. 7 and 8 are side cross-sectional views showing, in steps, a state in which an electromechanical brake according to an embodiment of the present disclosure implements a parking braking force in a braking state, and FIGS. 9 and 10 show, in steps, an operating state of an interlocking member when an electromechanical brake according to an embodiment of the present disclosure implements a parking brake force.

Referring to FIGS. 7 and 9, the electronic control unit operates the drive motor 139 to generate a rotational force in a braking state of a vehicle through the actuator. The second gear 139*b* provided on the motor shaft 139*a* of the drive motor 139 rotates, and the first gear 138 engaged with the second gear 139*b* rotates by receiving the rotational force.

As a result, the second screw 132 coupled to the first gear 138 rotate in the first direction and move linearly. That is, the relative position of the second screw 132 with respect to the piston 110 is adjusted as the same rotates and moves away from the disk. At this time, the second screw 132 and the piston 110 may rotate relative to each other by screwing. Therefore, during the linear movement of the second screw 132, the piston 110 may move by a certain amount in the direction opposite to the direction of the second screw 132. Accordingly, a load corresponding to generation of the parking braking force is transmitted to the second screw 132, and a load is generated.

When the second screw 132 is rotated, the receiving groove 136*a* rotates together, compressing the first return spring 137*a*. That is, the first return spring 137*a* is compressed by rotating the second screw 131 without rotating the first screw 131.

Meanwhile, when the second screw 132 and the first gear 138 rotate and linearly move to move over a certain section and thus a load is generated on the second screw 132, operations of the rotation and the linear movement of the second screw 132 and the first gear 138 are stopped. That is, an operation of the drive motor 139 may be stopped. This control of the drive motor 139 may be performed through an electronic control unit, and may be controlled by sensing, through the sensing portion 130, that a load is generated in the second screw 132 or a load is generated in the drive motor 139.

Referring next to FIGS. 8 and 10, the first screw 131 rotates in the first direction by the resilient force of the first return spring 137*a* and linearly moves. That is, the first screw 131 is not operated until the load of the parking braking force is generated in the second screw 132, and rotates in the first direction and performs linear movement after the load is generated on the second screw 132. At this time, the first screw 131 and the second screw 132 are independent members from each other, and when the load of the parking braking force is generated in the second screw 132, the first screw 131 is in an unloaded state. Therefore, the first screw 131 becomes able to easily rotate and move linearly by the resilient force of the first return spring 137*a*.

This first screw 131 is rotated and linearly moved to a point of contacting the second screw 132 and an operation is completed.

In this manner, the parking braking force may be achieved by the positioning portion 130, and the first screw 131 and the second screw 132 are moved in a direction away from the disk and the piston 110 is moved by a certain amount in a direction close to the disk, so that the wear of the brake pad 10 may be compensated. That is, it is possible to carry out an adjusting function which compensates the wear of the brake pad 10 simultaneously with the parking brake force implementation.

After the parking brake operation and the wear of the brake pad 10 are compensated, the electromechanical brake wheel according to the present embodiment returns to a state before the brake release or the brake operation of a vehicle through the parking brake release.

Figure 11:
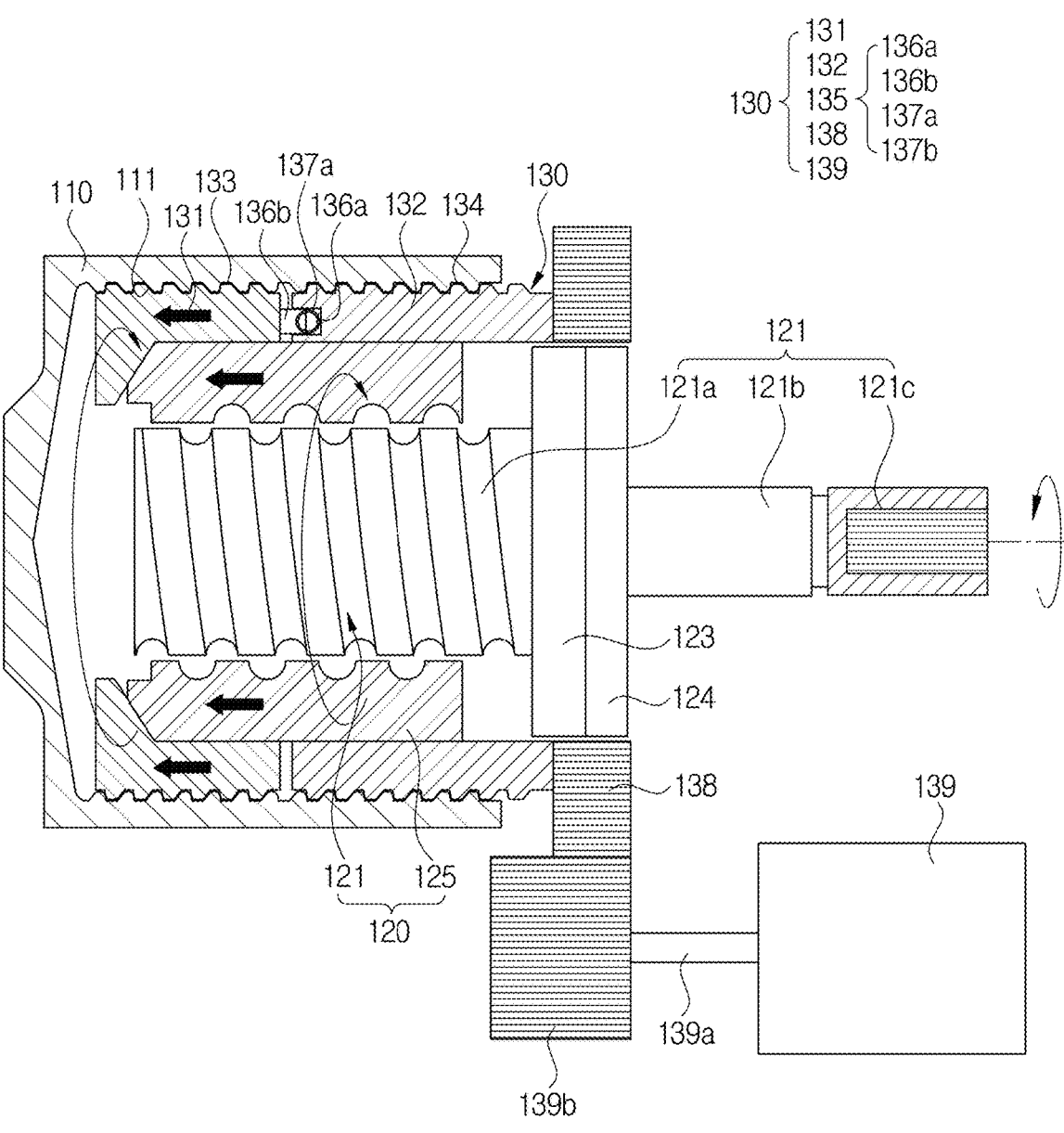
FIGS. 11 and 12 show, in steps, a state in which an electromechanical brake according to the embodiment of the present disclosure releases a parking braking force.
Figure 12:
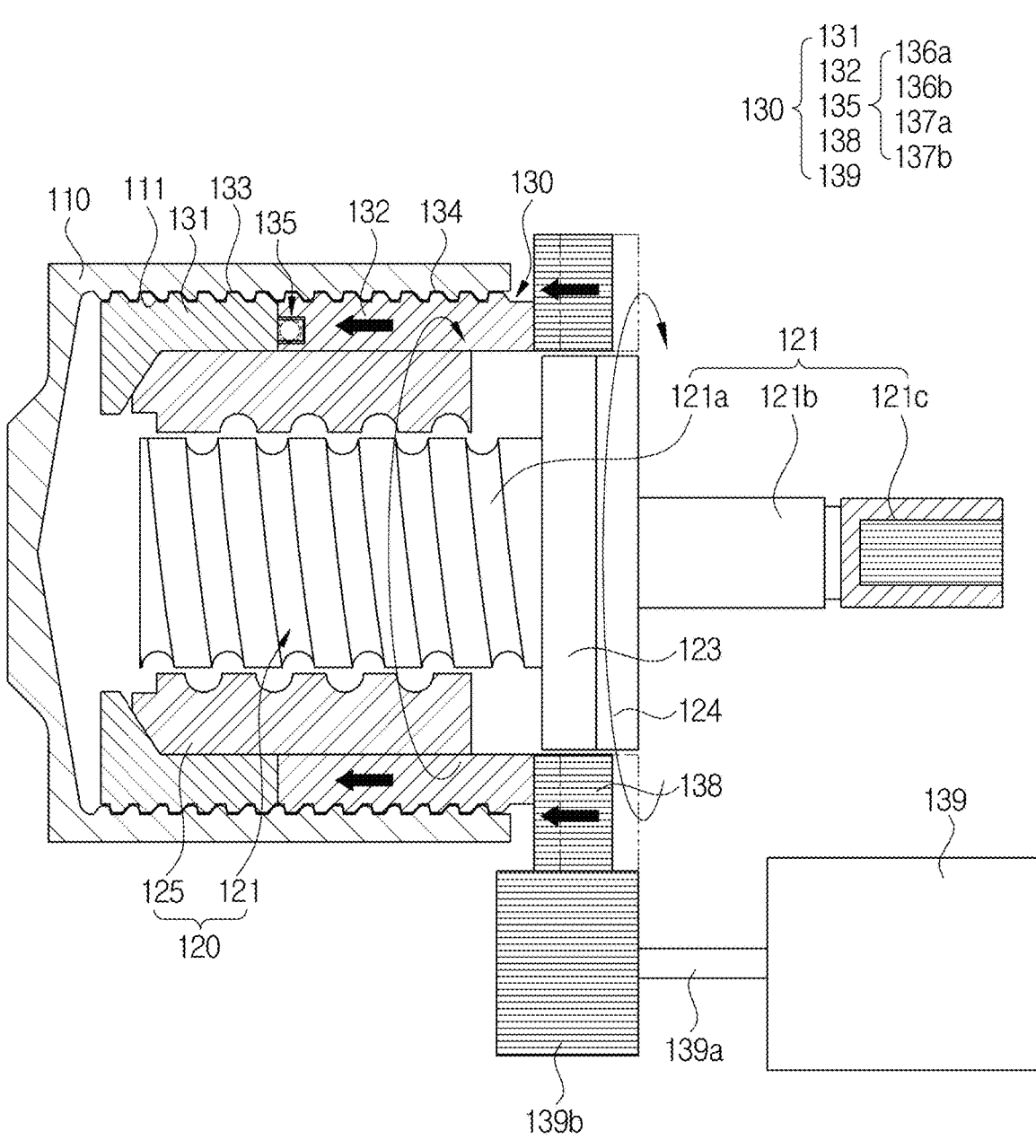
Figure 13:
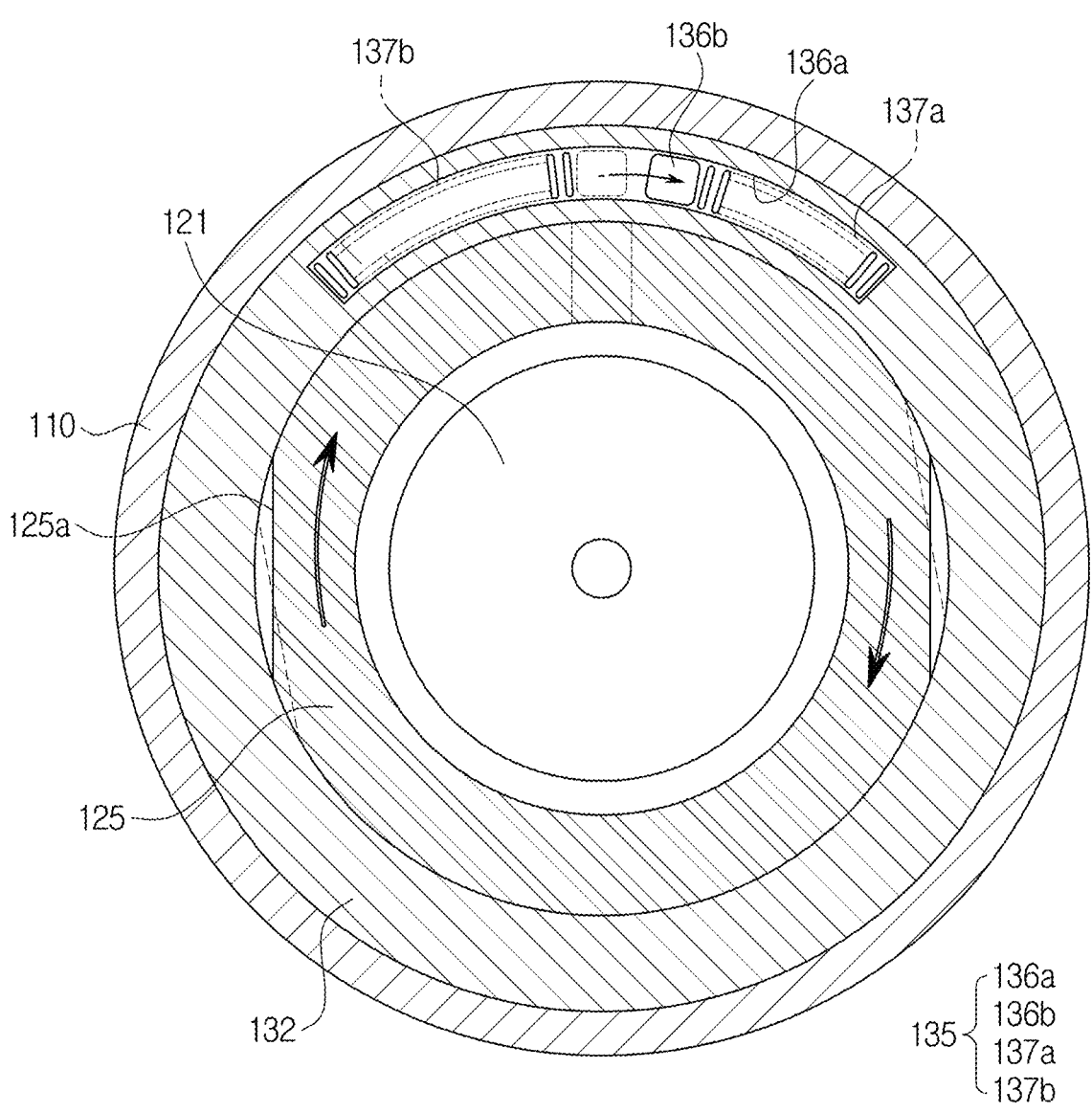
FIGS. 13 and 14 show, in steps, an operating state of an interlocking member when an electromechanical brake according to an embodiment of the present disclosure releases a parking braking force.
Figure 14:
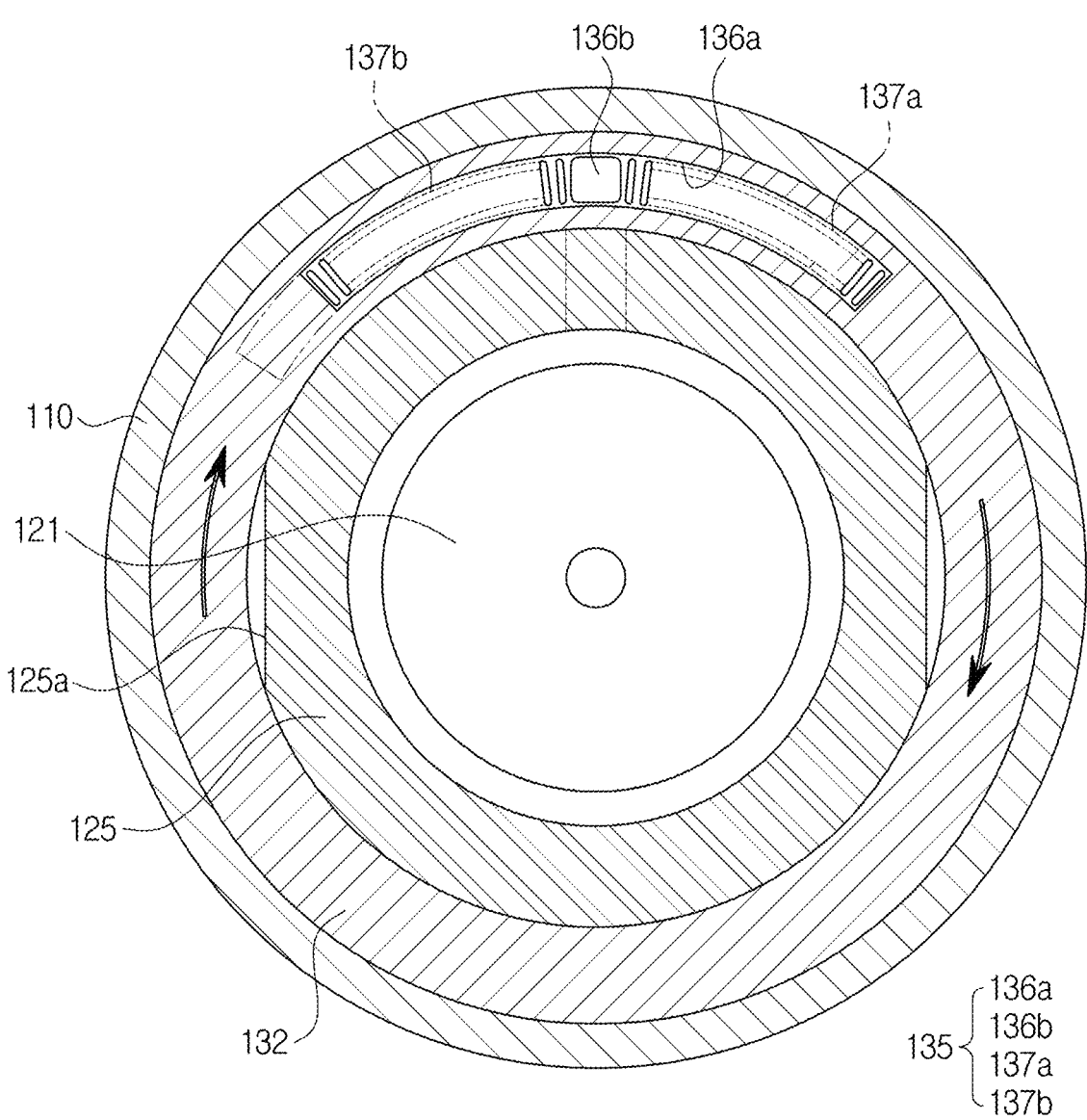

FIGS. 11 and 12 show, in steps, a state in which an electromechanical brake according to the embodiment of the present disclosure releases a parking braking force, and FIGS. 13 and 14 show, in steps, an operating state of an interlocking member when an electromechanical brake according to an embodiment of the present disclosure releases a parking braking force.

Referring to FIGS. 11 and 13, the electronic control unit operates the spindle 121 through the actuator for releasing the parking brake. That is, the spindle 121 is rotated in the first direction for braking. As a result, the nut 125 and the first screw 131 rotate together and move linearly.

Specifically, since the first screw 131 is provided in an unloaded state, the rotation of the nut 125 is not limited during the rotation in the first direction with respect to the spindle 121, and the first screw 131 rotates together. That is, the first screw 131 rotates in the second direction and moves linearly with the nut 125 moving toward the disk. Accordingly, as the first screw 131 moves in the direction approaching the disk, the relative position with respect to the piston 110 is adjusted.

When the first screw 131 is rotated, the pressing projection 136b rotates together and compresses the second return spring 137b. That is, the first screw 131 is rotated in a state where the second screw 132 is not rotated, thereby compressing the second return spring 137b.

Meanwhile, when the first screw 131 and the nut 125 move rotationally and linearly and move over a certain period and a load is generated on the first screw 131, the rotation and linear movement are stopped. That is, an operation of the actuator may be stopped. The control of the actuator may be performed through an electronic control unit, and may be controlled by sensing that a load is generated in the first screw 131 through the sensing portion 140.

When the rotation of the first screw 131 in the second direction is stopped, the second screw 132 moves linearly by the resilient force of the second return spring 137b and rotates in a second direction, as shown in FIG. 12 and FIG. 14. That is, the second screw 132 rotates in the second direction and linearly moves after a load is generated on the first screw 131. This second screw 132 is rotated and linearly moved to a point of contacting the first screw 131 and an operation is completed.

When operations of the first screw 131 and the second screw 132 are stopped, that is, when a parking brake release mode is completed, the piston 110 is operated to return to the original position. The same may be returned to the original position by means of a reaction force since the same is pressed back in the direction for braking through the actuator in the parking braking mode state. At this time, since the power conversion unit 120 is provided in a ball screw type, a self-lock function cannot be performed, and thus the nut 125 is retreated together with the pressing of the piston 110. Further, by operating the actuator to forcibly retreat the nut 125, the piston 110 may be returned to the pre-brake state or the brake release state.

As described above, although the present disclosure has been described with reference to the limited embodiments and drawings, it is needless to say that the disclosure is not limited thereto, and various modifications and variations may be made by those skilled in the art within the spirit of the present disclosure and the equivalents of the claims described below.

What is claimed is:

1. An electromechanical brake comprising:
a piston provided to be capable of advancing and retreating to press a pad plate;
a power conversion unit including a spindle which rotates by receiving a driving force from an actuator, and a nut which is connected to the spindle and moves forward or backward by rotation of the spindle in a first direction or a second direction; and
a positioning portion which is screwed with a thread formed inside the piston, receives a rotational force from a drive motor, linearly moves according to rotational movement, and adjusts a relative position of the piston with respect to the power conversion unit,
wherein the positioning portion comprises:

a first screw provided on one side outer surface of the nut and having a first thread meshing with the thread on an outer peripheral surface thereof;
a second screw provided on the other side outer surface of the nut and having a second thread meshing with the thread on an outer peripheral surface thereof;
a first gear configured to receive a rotational force from the drive motor and rotate together with the second screw; and
an interlocking member provided between the first screw and the second screw, and configured to interlock and linearly move the first and second screws by rotation of the first or second screw and adjust a relative position with the piston.

2. The electromechanical brake according to claim 1, further comprising:
a second gear provided on a motor shaft of the drive motor and meshing with the first gear,
wherein the first gear is provided as a wheel gear having an outer peripheral surface on which a gear tooth is formed so as to mesh with the second gear.

3. The electromechanical brake according to claim 2, wherein the first gear moves together with the linear movement of the second screw, and is rotatably supported on the spindle.

4. The electromechanical brake according to claim 1, wherein the first screw and the second screw are provided to contact each other.

5. The electromechanical brake according to claim 1, wherein the interlocking member comprises:
a receiving groove formed on a surface of the first screw or the second screw facing each other;
a first return spring inserted into the receiving groove and having one end supported by the first screw or the second screw;
a second return spring inserted into the receiving groove and having the other end supported by the first screw or the second screw; and
an pressing projection formed in the first screw or the second screw opposite to the receiving groove and interposed between the first return spring and the second return spring.

6. The electromechanical brake according to claim 5, wherein the pressing projection is provided to have a length longer than the linear movement distance of the first screw or the second screw.

7. The electromechanical brake according to claim 1, wherein the first screw is provided in a hollow cylindrical shape so as to surround a part of the front side of the nut, and each of the screw and the nut has an anti-rotation surface which is provided at least partially in a planar manner at a region contacting each other.

8. The electromechanical brake according to claim 1, wherein the spindle further comprises:
a flange formed on an outer peripheral surface of the spindle so as to extend in a radial direction; and
a thrust bearing contacting the flange and supporting an axial force.

9. The electromechanical brake according to claim 8, wherein an internal thread is formed on an inner peripheral surface of the nut, the spindle further comprises a first end portion on one side on which an external thread meshing with the internal thread is formed on an outer peripheral surface thereof, a second end portion on the other side connected to the actuator, and a central portion between the first end portion and the second end portion, and the flange is fixedly installed on an outer peripheral surface of the central portion.

10. The electromechanical brake according to claim 1, further comprising: an electronic control unit that controls operations of the actuator and the drive motor; and a sensing portion that measures a fastening force between the pad plate and a disk rotating with a wheel.

11. A method of operating the electromechanical brake of claim 1, comprising:

performing a braking operation of a vehicle by advancing or retreating the piston through the power conversion unit that receives a driving force from the actuator and converts a rotational force into linear movement; and when switching to a parking brake operating mode, transmitting power of the drive motor to the positioning portion to adjust a relative position with the piston, and simultaneously performing a parking braking operation and a thruster function.

12. The method of operating the electromechanical brake according to claim 11, wherein during a parking braking operation, a first gear and a second screw to which a rotational force is transmitted from the drive motor rotate together and linearly move in a direction away from a disk, the first screw is rotated and linearly moved in conjunction with the second screw, and the first screw is operated after a load corresponding to a parking braking force is generated on the second screw;

the first screw is rotated and linearly moved in conjunction with the second screw, and the first screw is operated after a load corresponding to a parking braking force is generated on the second screw.

13. The method of operating the electromechanical brake according to claim 11, wherein the power conversion unit is operated in a braking direction of a vehicle through the actuator in a state where the parking brake is completed, to release parking brake.

14. The method of operating the electromechanical brake according to claim 13, wherein when releasing parking brake, the power conversion unit is operated in the braking direction of a vehicle through the actuator, the nut and the first screw rotate together and linearly move in a direction approaching a disk, and the second screw rotates and linearly moves in conjunction with the first screw.

15. The method of operating the electromechanical brake according to claim 14, wherein the first screw is rotated and linearly moved together with the nut until a point in time where a section is transformed from an unloaded section to a loaded section.

\* \* \* \* \*